M. H. MANSFIELD.
Evaporating Pan.
No. 31,395.
Patented Feb. 12, 1861.
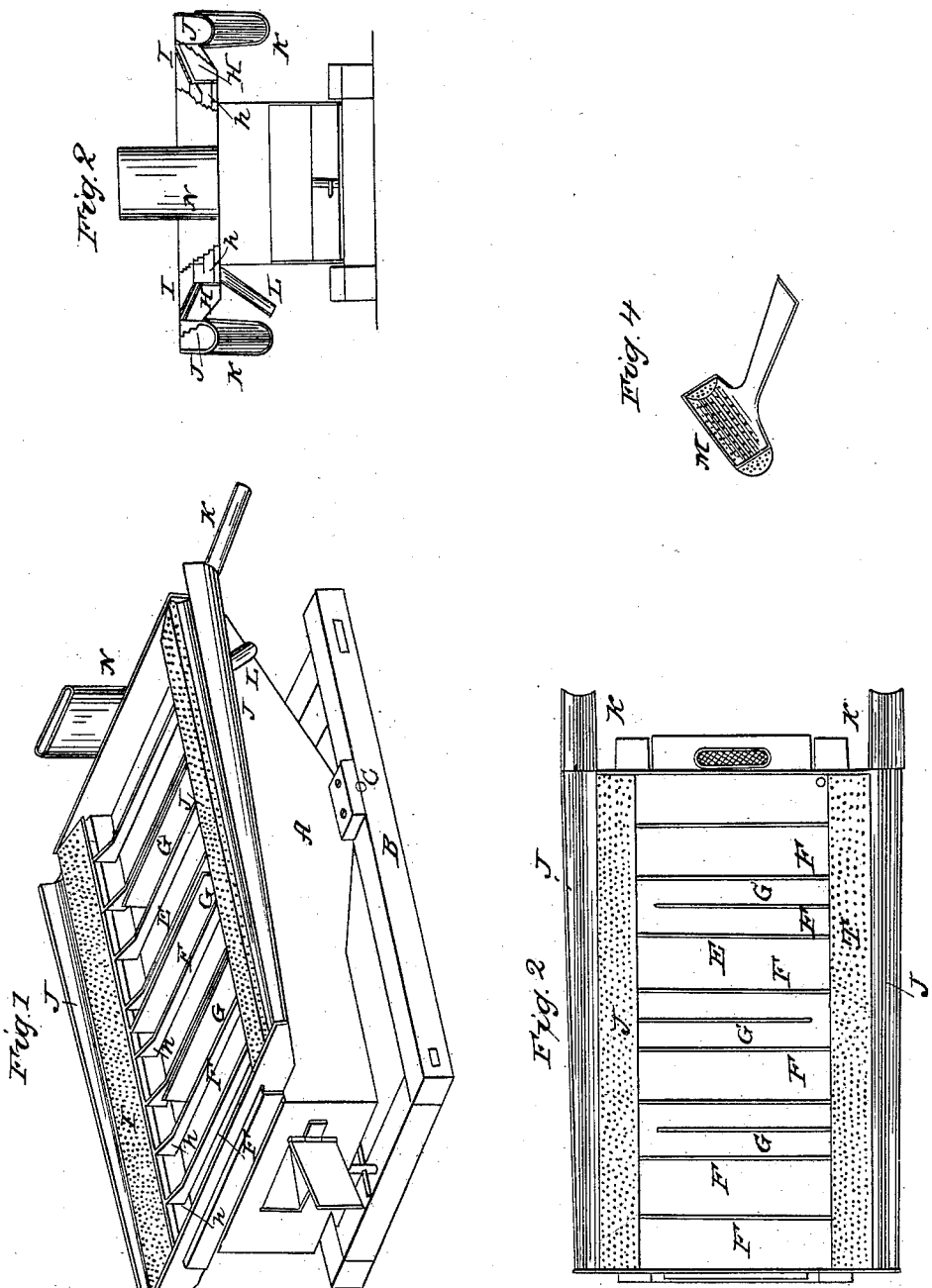

United States Patent Office.

M. H. MANSFIELD, OF ASHLAND, OHIO.

IMPROVEMENT IN APPARATUS FOR EVAPORATING SACCHARINE JUICES.

Specification forming part of Letters Patent No. 31,395, dated February 12, 1861.

*To all whom it may concern:*

Be it known that I, M. H. MANSFIELD, of Ashland, in the county of Ashland and State of Ohio, have invented certain new and useful Improvements in Sorghum-Evaporators; and I do hereby declare that the following is a full, clear, and exact description of the same, reference being had to the annexed drawings, making part of this specification, in which—

Figure 1 is a perspective view; Fig. 2, a top view; Fig. 3, a rear end view. Fig. 4 is a representation of the skimmer.

Like letters denote like parts in the several views.

The nature of my improvement relates to a certain arrangement by which the sides of the evaporator are inclined outward, and having connected therewith strainers, by which the sirup may be drained and returned to the pan, and the scum removed at the same time into a trough and conveyed off from the pan and sirup, the scum being removed from the sirup in the pan by an improved skimmer operated by hand.

The furnace A, Fig. 1, may be constructed in the ordinary way, and connected to the platform B by a hinge-joint at C, or by any other suitable means. The front part rests upon the adjusting-screw D. By this arrangement the pan may be inclined more or less, as the nature of the case requires. The pan E is connected with and placed above the furnace, with bars F across that do not extend to the bottom of the pan, and are just below the surface of the sirup, and which serve as guides for the skimmer in removing the scum.

G represents the ordinary divisions, extending nearly across the pan, to retard and direct the flow of the sirup in the pan. The pan extends out beyond the furnace at the sides, forming incline planes H above the sirup, as seen in Fig. 3. Above these inclinations are placed the strainers I, which, with the incline planes, extend the whole length of the pan, as seen in Figs. 1, 3, connected with the strainers on two gutters or troughs, J, which incline toward the spouts K.

The skimmer M, Fig. 4, may be made of perforated tin or other suitable material, forming a half-circle with end pieces, and of such length as to slide upon the guide-bars F between the division-plates G. The ends of the bars form inclines *h*, corresponding with the strainers, which allows the skimmer M, with the scum, to be easily brought up on the strainers I and into the spouts J, where it runs off at the spouts K and the sirup strained from the scum through the strainers to the incline planes H back into the pan, thus effectually separating scum from sirup without waste.

In boiling cane the greatest heat is at the center of the pan. Consequently, the scum is thrown up onto the sides, and if the sides are inclined, as in my improved pan, the scum by the action of boiling is thrown onto the inclined sides H, and can then be readily removed with the skimmer, the scum being brought over the inclines into the troughs J and discharged, as before stated.

The sirup is removed from the pan by means of spout L in the usual manner, the pan being adjusted, as before described, to give the desired direction to the sirup.

What I claim as my improvement, and desire to secure by Letters Patent, is—

1. The arrangement of the incline sides H and strainers I and the troughs J, in the manner and for the purpose set forth.

2. The guide-bars F with the inclines *h*, in combination with the incline sides H and strainers, in the manner and for the purpose described.

M. H. MANSFIELD.

Witnesses:
FRANCIS GRAHAM,
ROBT. M. MURRAY.